United States Patent [19]
Benschoter et al.

[11] Patent Number: 5,330,648
[45] Date of Patent: Jul. 19, 1994

[54] FILTER MEDIA HOLD DOWN MECHANISM

[75] Inventors: Barry R. Benschoter; Barry L. Nehls, both of Bowling Green, Ohio

[73] Assignee: Henry Filters, Inc., Bowling Green, Ohio

[21] Appl. No.: 905,446

[22] Filed: Jun. 29, 1992

[51] Int. Cl.$^5$ .................. B01D 33/04; B01D 33/056; B01D 29/96
[52] U.S. Cl. .................. 210/387; 210/416.1; 210/416.5
[58] Field of Search .............. 210/386, 387, 400, 401, 210/416.1, 416.5, 167, 168

[56] References Cited

U.S. PATENT DOCUMENTS

| | | | |
|---|---|---|---|
| 3,219,188 | 11/1965 | Hirs . | |
| 3,305,094 | 2/1967 | Casson | 210/408 |
| 3,364,662 | 1/1968 | Revell . | |
| 3,506,128 | 4/1970 | Pashaian . | |
| 3,743,100 | 7/1973 | Bahr . | |
| 3,896,030 | 7/1975 | Bahr . | |
| 4,055,497 | 10/1977 | Creps | 210/407 |
| 4,111,801 | 9/1978 | Jay . | |
| 4,137,169 | 1/1979 | El-Hindi | 210/400 |
| 4,142,971 | 3/1979 | Le Fur . | |
| 4,715,964 | 12/1987 | Harms et al. | 210/783 |
| 4,761,226 | 8/1988 | Creps | 210/106 |
| 4,774,010 | 9/1988 | Bratten | 210/387 |
| 5,221,468 | 6/1993 | Fox | 210/387 |

FOREIGN PATENT DOCUMENTS

| | | |
|---|---|---|
| 2716231 | 10/1978 | Fed. Rep. of Germany . |
| 3741226 | 6/1989 | Fed. Rep. of Germany . |
| 3900746 | 8/1990 | Fed. Rep. of Germany . |

*Primary Examiner*—Thomas M. Lithgow
*Attorney, Agent, or Firm*—Brooks & Kushman

[57] ABSTRACT

An improved media filtration apparatus includes an upper tank having an end wall and lower filtrate compartment, filter media interposed between the upper tank and filtrate compartment for filtering dirty liquid as it is communicated from the upper tank into the filtrate compartment, a conveyor for indexing the filter media in the upper tank, and a hold down mechanism including a frame having a plurality of lower rotatable spools for carrying and guiding the conveyor along the tank end wall and a skid plate extending generally vertically between the spools for urging the filter media between the hold down mechanism and tank end wall to prevent contaminant migration between the end wall and filter media.

5 Claims, 2 Drawing Sheets

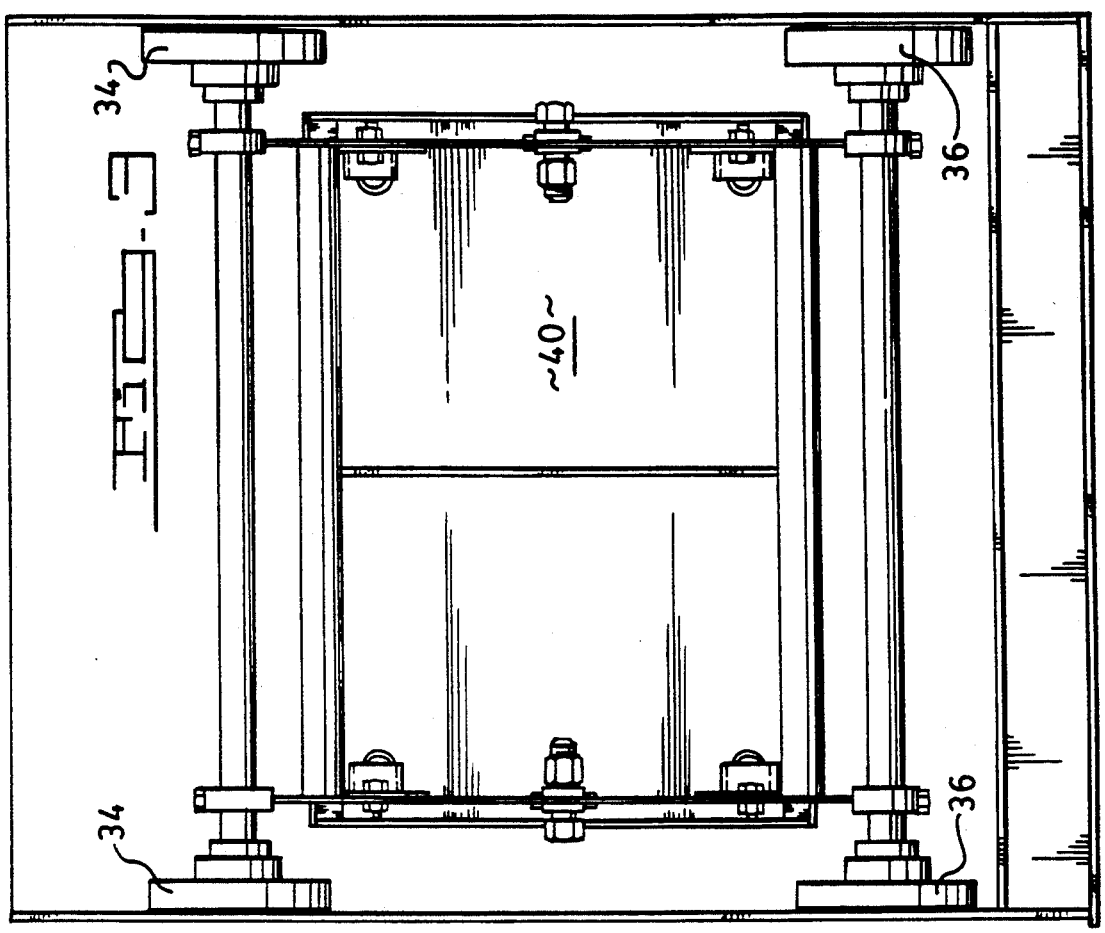
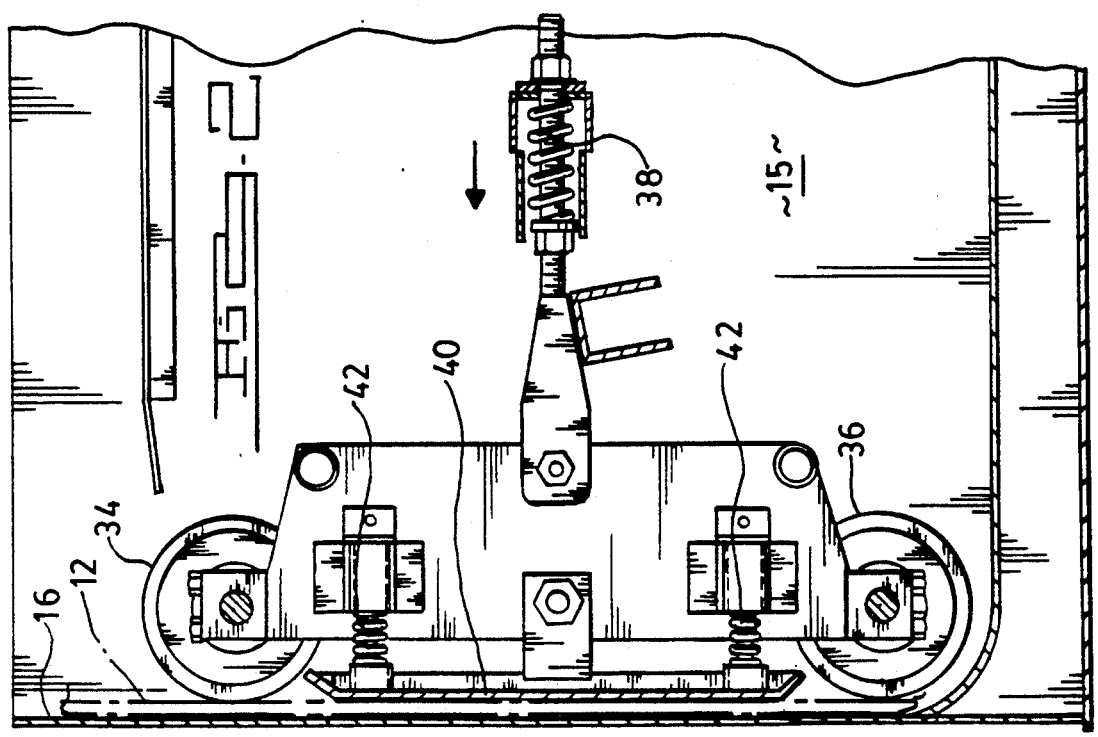

FILTER MEDIA HOLD DOWN MECHANISM

TECHNICAL FIELD

The present invention relates to media filters of the type including a filter tank divided horizontally into an upper dirty liquid tank and a lower filtrate compartment beneath a filter media interposed between the two compartments wherein a conveyor is utilized to move the filter media, and more particularly, to an improved media filter filtration apparatus including a mechanism urging the filter media in the upper liquid tank for preventing contaminant migration between the upper tank and lower compartment.

BACKGROUND ART

U.S. Pat. No. 4,761,226, assigned to the assignee of the present invention, discloses a media filter filtration apparatus having an upper filter tank. The upper tank includes an imperforate end wall and a perforate floor provided with a lower filtrate compart-ment covered with a filter media. The lower compartment is connected to the intake of a pump. The filter media, either a paper web or a fibrous filter aid, is supplied from a roll or spool of the media and moved downwardly along an end wall of the tank and across the floor where the media is pulled by a chain and slat conveyor. The filter media is indexed, that is moved, and subsequently removed, when contaminated by advancing the conveyor after any vacuum is relieved.

Typically, the chain and slat conveyor follow fixed shoes or wheels around a rear radius path adjacent the imperforate end wall. Normal tolerances associated with the conveyor prevent it from being held tightly against the filter media, end wall and floor. A take-up mechanism may be operated in connection with the indexing of the media to take-up the contaminated filter media.

In this arrangement, particulate in the dirty liquid get between the end wall of the tank and filter media and are free to be received into the lower filtrate compartment through the perforate floor of the tank. These particles contaminate the filtrate, reducing the performance and efficiency of the filtering device.

During start-up and replacement of media rolls, old media is torn in several places and knotted together with a replacement roll of filter media. The knotted section must make its way to the discharge side of the apparatus before integrity of the filter is restored.

SUMMARY OF THE INVENTION

An object of the present invention is to provide an improved media filter filtration apparatus having improved media feed which facilitates start-up and replacement of depleted filter media rolls.

Another object of the present invention is to provide an improved media filter filtration apparatus having automatic media pull-up and tracking.

A further object of the present invention is to provide an improved media filter filtration apparatus wherein the filter media effects a seal against a tank wall to prohibit migration of contaminant.

Yet another object of the invention is to provide an improved media filter filtration apparatus having a mechanism for urging the filter media against the tank wall to establish the seal between the filter media and tank wall.

A more specific object of the invention is carried out in an improved filtration apparatus including an upper tank for holding dirty liquid. Such a tank has an imperforate end wall and a perforate floor. A lower filtrate compartment beneath the floor receives liquid from the upper tank through the perforate floor and through filter media disposed between the upper tank and perforate floor.

The filter media is moved downwardly over a guide roller and positioned to guide the filter media along the end wall and along the floor for filtering out contaminants as the dirty liquid is pumped from the tank into the filtrate compartment. A conveyor moves the filter media within the upper tank. Such a filtration apparatus is disclosed in detail in U.S. Pat. No. 4,761,226 which is herein incorporated by reference.

The improvement includes a mechanism for urging the filter media against the end wall to effect a seal between the end wall and filter media to prevent contaminant migration therebetween. Preferably, the mechanism includes a frame mounted adjacent the tank end wall. The frame includes a plurality of upper and lower rotatable spools for carrying and guiding a chain and slat conveyor along the tank end wall.

The frame includes a skid plate extending between the spools and extending generally parallel to the end wall for guiding the filter media over the skid plate. A plurality of springs or spring force devices urges the skid plate toward the tank end wall to accommodate the tolerances associated with the conveyor and provide a means of constantly holding the media tightly against the tank wall and floor to prevent contaminant migration under and behind the filter media as it is introduced into the upper tank.

The seal provided by the urging mechanism allows the end of a new roll of filter media to be overlapped with the ending media of a previous roll in the filtration apparatus to effect the replacement of the filter media. The ends of the media are pinched together and the integrity of the filter is maintained during the filter media replacement procedure.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is an enlarged partial sectional elevational view of a mechanism for effecting a seal between the filter media and an end wall of the tank; and FIG. 3 is a frontal sectional elevational view of the urging mechanism of FIG. 2.

BEST MODE FOR CARRYING OUT THE INVENTION

Figure 1:
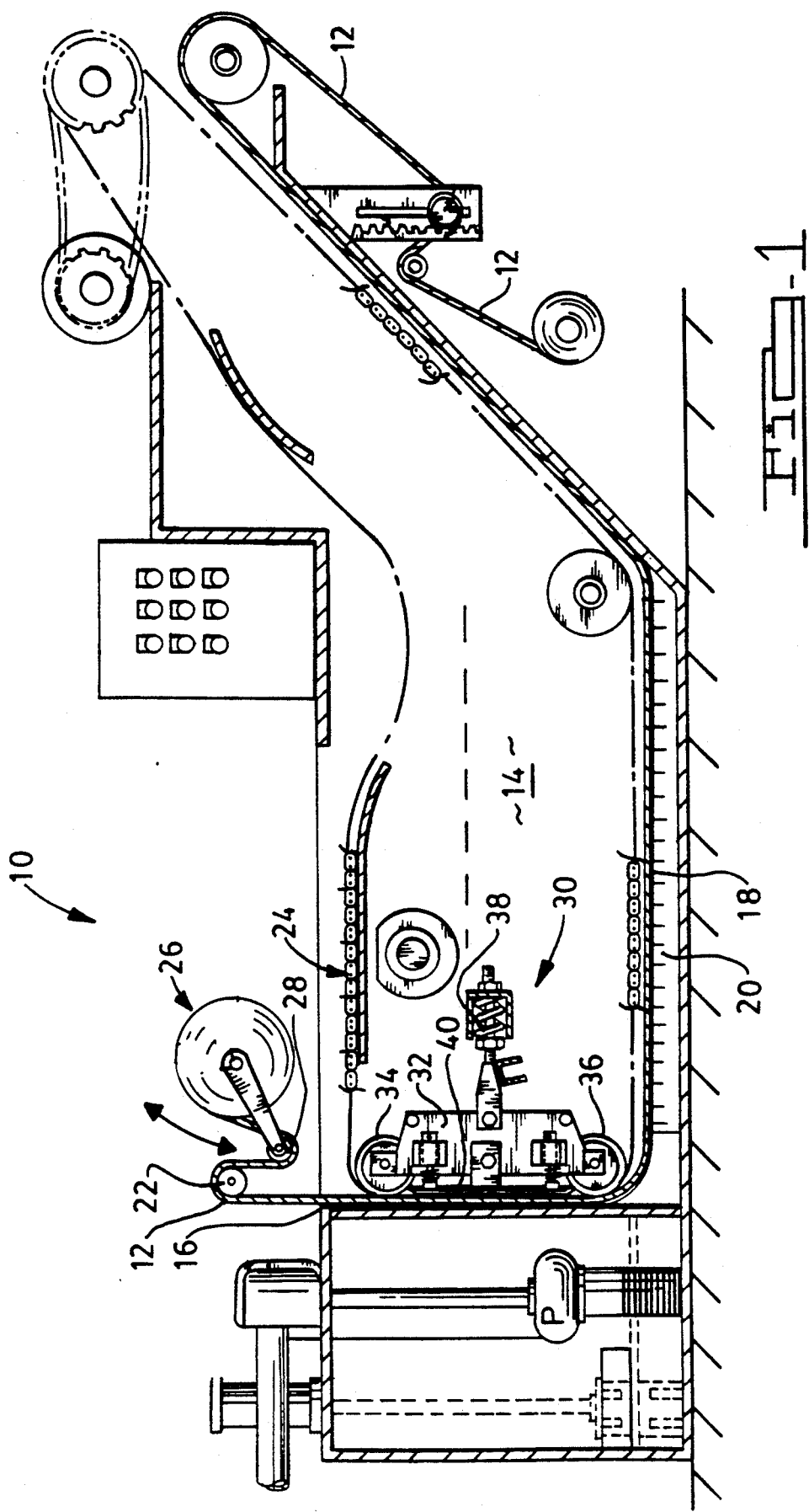
FIG. 1 is a sectional elevational view of a media filter filtration apparatus constructed in accordance with the present invention.

With reference to FIG. 1 of the drawings, an improved filtration apparatus is generally indicated by reference numeral 10 and is used for filtering contaminants out of dirty liquid. As is hereinafter more fully described, the improved filtration apparatus 10 utilizes a disposable filter media 12 such as a paper web or a fibrous filter aid to collect contaminant.

As shown in FIG. 1, the filtration apparatus 10 includes an upper tank 14 for holding dirty liquid. The upper tank 14 has an imperforate end wall 16 and a perforate floor 18. A lower filtrate compartment 20 is located beneath the perforate floor 18 and receives liquid from the upper tank through the perforate floor. The filter media 12 is interposed between the upper tank 14 and perforate floor 18 to capture and retain contaminant from the dirty liquid being communicated from the upper tank 14 into the lower filtrate compartment 20.

A guide roller 22 is mounted above the upper tank 14. The filter media is guided over guide roller 22 and moved downwardly into the tank. Guide roller 22 guides the filter media 12 along the end wall 16 and along the floor 18 for filtering out contaminants as the dirty liquid is received from the tank 14 into the filtrate compartment 20.

As seen in FIG. 1, an endless chain and slat conveyor 24 is operable to index the filter media 12 within the upper tank 14 downwardly along the imperforate end wall 16 and along the perforate floor 16.

A roll of filter media 12 is mounted on a filter media feed mechanism 26 which is mounted adjacent the guide roller 22. A tension roller 28 is movably mounted between the feed mechanism 26 and the guide roller 22 to provide constant tension on the filter media 12 being moved by the chain and slat conveyor 24.

With further reference to FIG. 1 and with reference to FIGS. 2 and 3, a hold down mechanism 30 is mounted in the upper tank 14 for guiding the chain and slat conveyor 24 and for urging the filter media 12 against the imperforate end wall 16 to prevent contaminant migration between the end wall and filter media. With continuing reference to FIGS. 2 and 3, the hold down mechanism 30 includes a frame 32 mounted adjacent the tank end wall 16. The frame includes a plurality of upper and lower rotatable spools 34,36 for carrying and guiding the chain and slat conveyor 24 along the tank end wall 16 and a spring 38 for urging the mechanism toward the end wall to effectively create a seal between the filter media and tank end wall.

Frame 32 also includes a skid plate 40 extending generally vertically between the spools 34,36 for guiding the filter media over the skid plate and for urging the filter media against the tank end wall 16. The skid plate 40 is movable relative to the frame 32 and includes springs 42 urging the skid plate 40 toward end wall 16 to cooperate with the conveyor 24 in sealing out the migration of contaminant between the filter media and end wall 16 which prevents contaminant from getting on the back side of the filter media 12 and into filtrate compartment 20.

While the best mode for carrying out the invention has been described in detail, those familiar with the art to which this invention relates will recognize various alternative designs and embodiments for practicing the invention as defined by the following claims.

What is claimed is:

1. In an improved filtration apparatus including an upper tank for holding dirty liquid and having an imperforate upstream end wall and a perforate floor, and a lower filtrate compartment beneath the floor for receiving liquid from the upper tank through said perforate floor, a guide roller over which the filter media is moved downwardly and positioned to guide the filter media first along the upstream end wall and then downstream along the floor for filtering out contaminants as the dirty liquid is received from the tank into the filtrate compartment, and a chain and slat conveyor for moving the filter media, wherein the improvement comprises:

a hold down mechanism means for urging the filter media against the upstream imperforate end wall thereby to prevent contaminant migration between the end wall and the filter media;

the hold down mechanism means including a frame mounted adjacent the upstream end wall; said hold down mechanism means including a spring assembly for elastically urging said frame toward the tank end wall; said frame including a plurality of upper and lower rotatable spools for carrying and guiding said chain and slat conveyor along the tank end wall and urging the filter media therebetween;

the frame further including a skid plate extending generally vertically between said spools; said skid plate extending generally parallel to said end wall for guiding the filter media thereover.

2. The improvement of claim 1 wherein said frame further includes means for allowing movement of said skid plate relative to said frame and urging said skid plate toward the tank end wall.

3. The improvement of claim 2 wherein said means for allowing movement and urging said skid plate comprises a plurality of spring assemblies.

4. In an improved filtration apparatus including an upper tank for holding dirty liquid and having an imperforate upstream end wall and a perforate floor, and a lower filtrate compartment beneath the floor for receiving liquid from the upper tank through said perforate floor, filter media between said upper tank and said perforate floor, a guide roller over which the filter media is moved downwardly and positioned to guide the filter media first along the end wall and then downstream along the floor for filtering out contaminants as the dirty liquid is received from the tank into the filtrate compartment, and a conveyor for moving the filter media, wherein the improvement comprises:

a hold down mechanism means movably mounted adjacent the imperforate end wall in the upper tank for elastically urging the filter media against the end wall; said mechanism being defined by a frame including a plurality of upper and lower rotatable spools for carrying and guiding said conveyor along the tank end wall and a skid plate extending between said spools for urging the filter media therebetween thereby to prevent contaminant migration between the end wall and filter media.

5. The apparatus of claim 4 wherein the conveyor is a chain and slat conveyor.

* * * * *